US012619998B2

(12) United States Patent
Ramarao

(10) Patent No.: US 12,619,998 B2
(45) Date of Patent: May 5, 2026

(54) PREDICTING MARKETING OUTCOMES USING CONTRASTIVE LEARNING

(71) Applicant: Oracle International Corporation, Redwood Shores, CA (US)

(72) Inventor: Karempudi V. Ramarao, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 220 days.

(21) Appl. No.: 17/946,354

(22) Filed: Sep. 16, 2022

(65) Prior Publication Data
US 2024/0095762 A1 Mar. 21, 2024

(51) Int. Cl.
*G06Q 30/02* (2023.01)
*G06N 20/20* (2019.01)
*G06Q 30/0202* (2023.01)

(52) U.S. Cl.
CPC ......... *G06Q 30/0202* (2013.01); *G06N 20/20* (2019.01)

(58) Field of Classification Search
CPC .......................................... G06Q 10/00–90/00
See application file for complete search history.

(56) References Cited

U.S. PATENT DOCUMENTS

| | | | |
|---|---|---|---|
| 10,984,446 B1 * | 4/2021 | Becker ............... | G06Q 30/0202 |
| 2011/0035594 A1 * | 2/2011 | Fox ........................ | G06Q 30/02 713/170 |

| | | | |
|---|---|---|---|
| 2016/0132608 A1 * | 5/2016 | Rathod .................. | H04W 4/21 707/722 |
| 2018/0337871 A1 * | 11/2018 | Matta .................... | H04L 67/306 |
| 2018/0349485 A1 * | 12/2018 | Carlisle .............. | G06F 16/9535 |
| 2019/0073580 A1 * | 3/2019 | Dzhulgakov .......... | G06N 20/20 |
| 2021/0075875 A1 | 3/2021 | Liu et al. | |

OTHER PUBLICATIONS

Song et al., "Autoint: Automatic feature interaction learning via selfattentive neural networks," In Proceedings of the 28th ACM International Conference on Information and Knowledge Management, 2019, pp. 1161-1170.

* cited by examiner

*Primary Examiner* — Arif Ullah
(74) *Attorney, Agent, or Firm* — Invoke

(57) ABSTRACT

Techniques for predicting marketing outcomes using contrastive learning are disclosed, including: obtaining historical marketing messages; obtaining historical open rates associated respectively with the historical marketing messages; based on the historical marketing messages, generating latent space representations associated respectively with the historical marketing messages; based on the latent space representations and respective contents of the historical marketing messages, training a first machine learning model to map contents of marketing messages to corresponding latent space representations of the marketing messages; based at least on the latent space representations and the historical open rates, training a second machine learning model to map latent space representations of marketing messages to predicted open rates of the marketing messages.

13 Claims, 7 Drawing Sheets

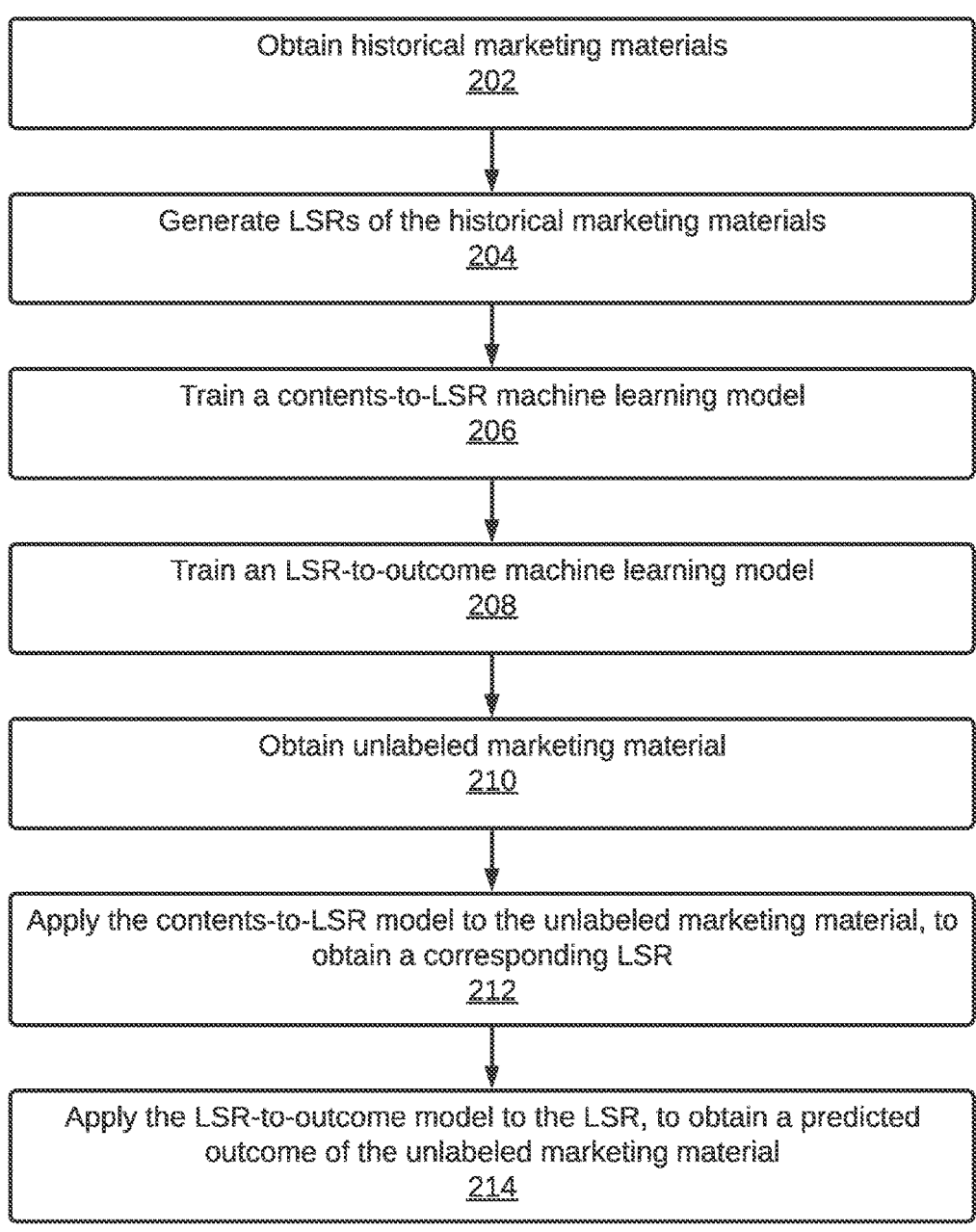

Obtain historical marketing materials
202

Generate LSRs of the historical marketing materials
204

Train a contents-to-LSR machine learning model
206

Train an LSR-to-outcome machine learning model
208

Obtain unlabeled marketing material
210

Apply the contents-to-LSR model to the unlabeled marketing material, to obtain a corresponding LSR
212

Apply the LSR-to-outcome model to the LSR, to obtain a predicted outcome of the unlabeled marketing material
214

Select pairs of historical marketing materials associated with similar outcomes
302

Generate vectors that represent the historical marketing materials
304

Compute scaled dot products of each pair of vectors
306

Threshold condition satisfied?
308

Yes

No

Adjust the vectorization formula
310

Use the vectors as LSRs of the historical marketing materials
312

PREDICTING MARKETING OUTCOMES USING CONTRASTIVE LEARNING

TECHNICAL FIELD

The present disclosure relates to predicting marketing outcomes. In particular, the present disclosure relates to predicting marketing outcomes using machine learning.

BACKGROUND

In general, it is very difficult to predict how successful a particular marketing campaign will be. For example, given a particular marketing email message, it is difficult to predict what the open rate for that message will be. One approach is to perform natural language processing (NLP) on the subject lines of email messages and attempt to correlate the semantics of each subject line to its open rate. However, the semantics of email subject lines rarely correlate to their respective open rates. Accordingly, typical approaches that rely on techniques such as regression modeling tend to be ineffective for predicting marketing outcomes.

Approaches that rely on human judgment—for example, hiring a marketing expert to analyze prior campaigns and craft subject lines for new campaigns—tend to be ineffective for similar reasons; the semantics of email subject lines (i.e., those parts that are most readily discernible to human readers) rarely correlate to their respective open rates. NLP, regression modeling, and such tend to suffer similarly for other kinds of campaign predictions, such as predicting the click rate for a given call to action (e.g., a text and/or image-based call to action), rates of progression to different stages of a marketing funnel, etc.

One approach to predicting marketing outcomes is described in U.S. patent application Ser. No. 17/100,525, titled "Techniques for Selecting Content to Include in User Communications," filed Nov. 20, 2020, the entire contents of which are incorporated herein by reference. There, user-facing content (e.g., email subject lines) is used to generate a vocabulary of "token-sets," where each token-set can be associated with a performance parameter that represents the impact that token-set has on the target outcome (e.g., open rate). By focusing on specific phrases, this approach overcomes some of the problems associated with semantic analysis, while still relying on analysis of user-facing content, i.e., specific phrases (e.g., single-word phrases, two-word phrases, three-word phrases, etc.) that the intended recipient is expected to see.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment and mean at least one. In the drawings:

FIG. 2 illustrates an example set of operations for predicting marketing outcomes using contrastive learning in accordance with one or more embodiments;

DETAILED DESCRIPTION

Figure 1:
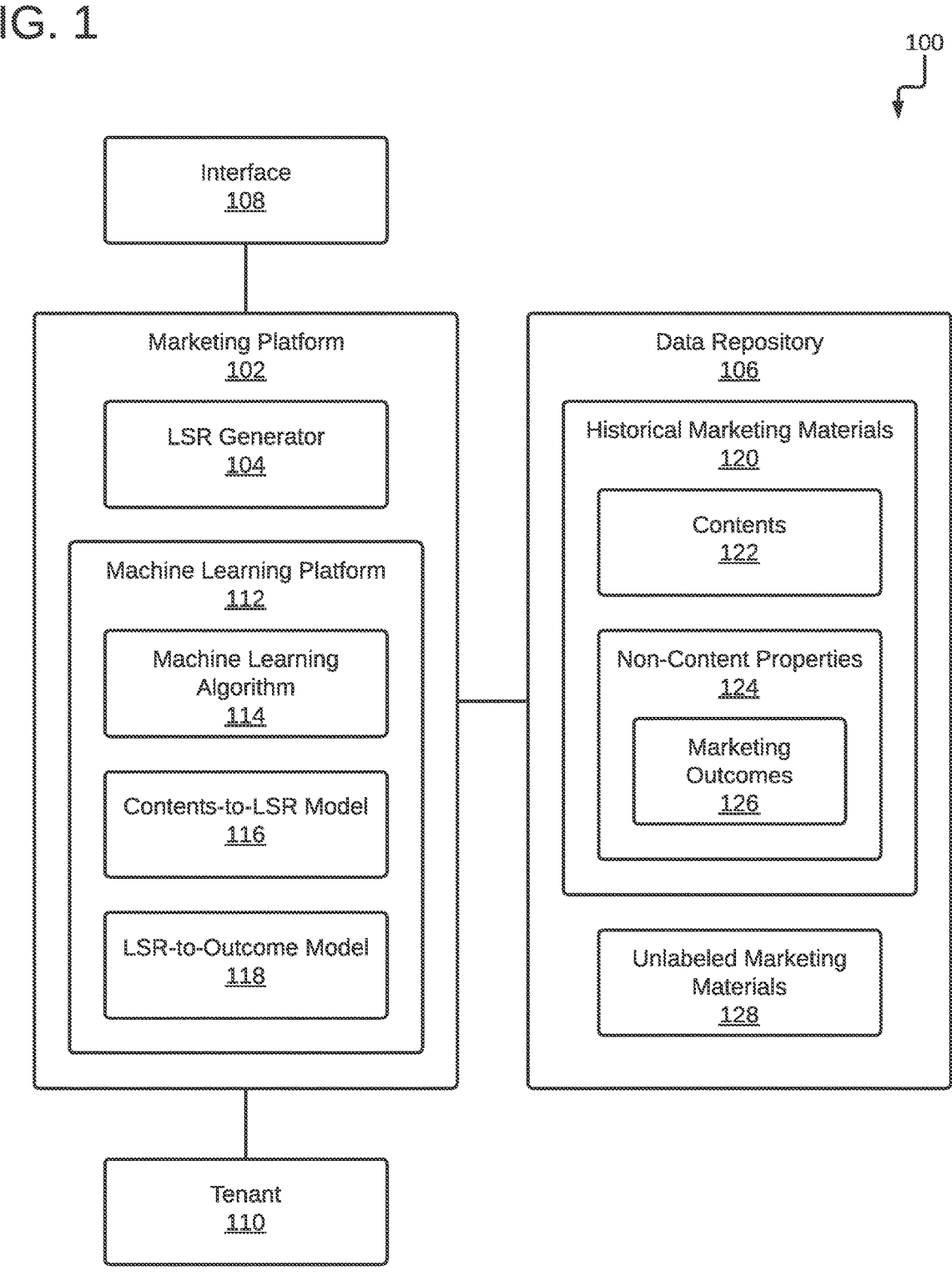
FIG. 1 shows a block diagram that illustrates an example of a system in accordance with one or more embodiments.

In the following description, for the purposes of explanation and to provide a thorough understanding, numerous specific details are set forth. One or more embodiments may be practiced without these specific details. Features described in one embodiment may be combined with features described in a different embodiment. In some examples, well-known structures and devices are described with reference to a block diagram form, in order to avoid unnecessarily obscuring the present invention.

The following table of contents is provided for reference purposes only and should not be construed as limiting the scope of one or more embodiments 1. GENERAL OVERVIEW
2. EXAMPLE SYSTEM
   2.1. SYSTEM COMPONENTS
   2.2. MARKETING PLATFORM
   2.3. DATA STORAGE
   2.4. USER INTERFACE
   2.5. TENANTS
   2.6. MACHINE LEARNING
3. PREDICTING MARKETING OUTCOMES USING CONTRASTIVE LEARNING
   3.1. PROCESS OVERVIEW
   3.2. GENERATING LSRS OF HISTORICAL MARKETING MATERIALS
   3.3. TRAINING A CONTENTS-TO-LSR MODEL
4. EXAMPLE EMBODIMENT
5. EXAMPLE SUBJECT LINES
6. CONTENT DISTRIBUTION
7. COMPUTER NETWORKS AND CLOUD NETWORKS
8. MICROSERVICE APPLICATIONS
   8.1. TRIGGERS
   8.2. ACTIONS
9. HARDWARE OVERVIEW
10. MISCELLANEOUS; EXTENSIONS

1. General Overview

One or more embodiments predict marketing outcomes for marketing materials, without relying on attempts to correlate semantic content (for example, email subject lines) with marketing outcomes (for example, open rates). One or more embodiments use contrastive learning to train a machine learning model, based on historical marketing outcomes independent of the corresponding historical marketing materials' contents, to generate latent space representations of marketing materials. One or more embodiments further train a machine learning model to predict marketing outcomes based on the latent space representations. Together, these two machine learning models can predict marketing outcomes without relying on highly fallible semantic analysis techniques. Thus, one or more embodiments provide a technical solution to the technical problem of predicting marketing outcomes when (a) the relationship between semantic content and actual marketing outcomes is known to be highly variable and unreliable and (b) correlations between marketing materials and their respective outcomes depend on non-content attributes and therefore are not readily discernible by humans.

In an embodiment, predicting marketing outcomes allows for marketing strategies that are based on consistent, quantifiable metrics, rather than subjective decisions. Responsive to predicting a marketing outcome for one or more sets of marketing materials, the system may present (e.g., in a user interface) a marketing recommendation. For example, the system may recommend publishing a particular set of marketing materials over another set of marketing materials, based on their respective predicted marketing outcomes. Alternatively or additionally, responsive to comparing the predicted marketing outcomes, the system may perform one or more actions without user input, such as publishing the marketing materials with the best predicted outcomes.

One or more embodiments described in this Specification and/or recited in the claims may not be included in this General Overview section.

2. Example System

2.1. System Components

FIG. 1 illustrates an example of a system 100 in accordance with one or more embodiments. As illustrated in FIG. 1, the system 100 includes a marketing platform 102, a data repository 106, an interface 108, one or more tenants 110, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

In one or more embodiments, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

2.2. Marketing Platform

In general, a marketing platform 102 refers to hardware and/or software configured to perform operations associated with digital marketing services (e.g., email marketing, social media marketing, text message marketing, etc.). Such services may include, for example: generating marketing materials; publishing/transmitting marketing materials; tracking outcomes (e.g., end-user click rates/counts, open rates/counts, view rates/counts, etc.) for specific marketing materials; analyzing marketing materials for opportunities to improve outcomes (e.g., increasing click, open, and/or view rates/counts); etc. In particular, the marketing platform 102 is configured to perform operations for predicting marketing outcomes using contrastive learning, examples of which are described herein.

In an embodiment, a latent space representation (LSR) generator 104 is configured to generate LSRs of historical marketing materials 120. LSRs are representations of historical marketing materials 120 in latent space, where the materials that are most similar according to one or more designated features are located closest to each other in the latent space. For example, the LSRs may be N-dimensional vectors that each represent a subset of the underlying historical marketing materials 120 (e.g., a particular email, social media post, or text message), where vectors that represent the most similar materials are located closest to each other in N-dimensional latent space. The LSR generator 104 may be configured to generate LSRs where proximity in latent space is associated with the historical marketing materials' 120 respective marketing outcomes 126. For example, if the historical marketing materials 120 include emails, the marketing outcomes 126 may include corresponding open rates, and the LSRs associated with the most similar open rates may be located closest to each other in latent space. Examples of operations for generating LSRs of historical marketing materials 120 are described in further detail below.

In an embodiment, a machine learning platform 112 is configured to train and/or apply one or more machine learning models, using one or more machine learning algorithms 114. Specifically, the machine learning algorithm(s) 114 may be configured to perform one or more operations described herein for training a contents-to-LSR model 116 and/or an LSR-to-outcome model 118. A contents-to-LSR model 116 is a machine learning model configured to generate LSRs of marketing materials based on their contents (e.g., email subject lines). An LSR-to-outcome model 118 is a machine learning model configured to generate a predicted marketing outcome for marketing materials, based on their respective LSRs. Examples of operations for training and using a contents-to-LSR model 116 and/or an LSR-to-outcome model 118 are described in further detail below.

2.3. Data Storage

In one or more embodiments, a data repository 106 is any type of storage unit and/or device (e.g., a file system, database, collection of tables, and/or any other storage mechanism) for storing data. In an embodiment, the data repository 106 is configured to store historical marketing materials 120. Historical marketing materials 120 may include prior instances of marketing materials already presented to potential customers. For example, the historical marketing materials 120 may include emails, text messages, social media advertisements, web pages, multimedia files, and/or another kind of marketing material that has been presented to potential customers.

Contents 122 include target-facing properties of the historical marketing materials 120. For example, the contents

122 may include the text (if any) presented to potential consumers and/or multimedia content included in the marketing materials. In particular, the contents 122 may include email subject lines, which often are the only contents visible to a recipient before opening an email. Non-content properties 124 include properties of the historical marketing materials 120 that are not target-facing. For example, the non-content properties 124 may include metadata embedded in, or otherwise associated with, the historical marketing materials 120. In particular, the non-content properties 124 include marketing outcomes 126, which indicate how well the respective historical marketing materials 120 performed according to one or more performance metrics (e.g., open rate, click rate, rates of progression to different stages of a marketing funnel, etc.).

In an embodiment, the data repository 106 is configured to store unlabeled marketing materials 128. Unlabeled marketing materials 128 are marketing materials that are not labeled with marketing outcomes. Marketing outcomes corresponding to the unlabeled marketing materials 128 may be unknown (e.g., if the marketing materials are not yet live), unreliable, and/or otherwise unavailable (e.g., if a particular publishing platform does not expose an interface for obtaining performance metrics). As one example, the unlabeled marketing materials 128 may include prospective marketing materials being evaluated before publication. The unlabeled marketing materials 128 may include materials that are already live and/or materials that are not already live. The unlabeled marketing materials 128 may include different versions of a proposed marketing campaign (e.g., an email campaign), where predicted marketing outcomes for each version can help decide which version to publish.

The data repository 106 may include multiple different storage units and/or devices. The multiple different storage units and/or devices may or may not be of the same type or located at the same physical site. The data repository 106 may be implemented or executed on the same computing system as the marketing platform 102 and/or on a computing system separate from the marketing platform 102. The data repository 106 may be communicatively coupled to one or more other components of the system 100 via a direct connection or via a network. Information describing historical marketing materials 120 and/or unlabeled marketing materials 128 may be implemented across any of the components of the system 100. However, this information is illustrated within the data repository 106 for purposes of clarity and explanation.

2.4. User Interface

In one or more embodiments, an interface 108 refers to hardware and/or software configured to facilitate communications between a user and the marketing platform 102. The interface 108 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. Different components of the interface 108 may be specified in different languages. For example, the behavior of user interface elements may be specified in a dynamic programming language, such as JavaScript. The content of user interface elements may be specified in a markup language, such as hypertext markup language (HTML) or XML User Interface Language (XUL).

The layout of user interface elements may be specified in a style sheet language, such as Cascading Style Sheets (CSS). Alternatively, the interface 108 may be specified in one or more other languages, such as Java, Python, C, or C++.

2.5. Tenants

In one or more embodiments, a tenant 110 is a corporation, organization, enterprise, or other entity that accesses a shared computing resource, such as the marketing platform 102. The system 100 may include multiple tenants 110 that are independent from each other, such that a business or operation of one tenant is separate from a business or operation of another tenant. Some examples of multi-tenant architectures in accordance with one or more embodiments are described in further detail below.

2.6. Machine Learning

In one or more embodiments, a machine learning algorithm 114 is an algorithm that can be iterated to learn a target model (e.g., a contents-to-LSR model 116 and/or an LSR-to-outcome model 118) that best maps a set of input variables to one or more output variables, using a set of training data (e.g., historical marketing materials 120). The training data includes datasets and associated labels. The datasets are associated with input variables for the target model. The associated labels are associated with the output variable(s) of the target model. For example, a label associated with a dataset in the historical marketing materials 120 may indicate one or more corresponding marketing outcomes 126. The training data may be updated based on, for example, feedback on the accuracy of the current target model. Updated training data may be fed back into the machine learning algorithm 114, which may in turn update the target model.

The machine learning algorithm 114 may generate a target model such that the target model best fits the datasets of the training data to the labels of the training data. Specifically, the machine learning algorithm 114 may generate the target model such that when the target model is applied to the datasets of the training data, a maximum number of results determined by the target model match the labels of the training data (e.g., historical marketing materials 120). For example:

1. A machine learning algorithm 114 may generate a contents-to-LSR model 116 so that when applied to the contents 122 of historical marketing materials 120 (e.g., email subject lines), the contents-to-LSR model 116 outputs LSRs that match those generated by an LSR generator 104 for the corresponding materials.
2. A machine learning algorithm 114 may generate an LSR-to-outcome model 118 so that when applied to LSRs generated by the LSR generator 104 and/or the contents-to-LSR model 116, the LSR-to-outcome model 118 outputs predicted marketing outcomes that match the marketing outcomes 126 for the corresponding materials.

Different target models be generated based on different machine learning algorithms and/or different sets of training data.

The machine learning algorithm 114 may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In an embodiment, a machine learning algorithm 114 is configured to perform contrastive learning. In general, contrastive learning trains a machine learning model to identify similarities in unlabeled data, by comparing (or "contrasting") data points with each other. One or more embodiments use contrastive learning to identify similarities between historical marketing materials 120, without relying on semantic analysis of target-facing contents 122 such as email subject lines. Techniques for contrastive learning are discussed in further detail below.

3. Predicting Marketing Outcomes Using Contrastive Learning

3.1. Process Overview

FIG. 2 illustrates an example set of operations for predicting marketing outcomes using contrastive learning in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

To train one or more machine learning models, a system may obtain historical marketing materials (Operation 202). As described above, the marketing materials include marketing contents and non-content properties. The non-content properties may include marketing outcomes associated with the historical marketing materials.

The system may generate LSRs of the historical marketing materials (Operation 204). Generating LSRs may be performed in various ways. In an embodiment, the LSRs are vectors that represent respective marketing materials. The system may generate the LSRs based on non-content properties, without regard to the marketing materials' respective contents (e.g., without regard for email subject lines). For example, the system may generate the LSRs so that LSRs for marketing materials having the most similar marketing outcomes are located closest to each other in latent space, even if the target-facing contents of those marketing materials are very different (i.e., the contents would not be considered a close match if compared using semantic analysis techniques). Some examples of operations for generating LSRs are described in further detail below with respect to FIG. 3.

The system may train a machine learning model to generate LSRs based on marketing materials' respective contents (Operation 206), i.e., a contents-to-LSR machine learning model (also referred to herein as a "C2LSR model," for ease of discussion). Specifically, given the contents of the historical marketing materials (e.g., email subject lines) in the absence of the corresponding marketing outcomes, the system trains the C2LSR model to generate LSRs that match those generated as described above with respect to FIG. 204. Thus, the C2LSR is trained to generate LSRs that tend to be closest to each other in latent space when predicted marketing outcomes are most similar—even though (1) the earlier-generated LSRs were generated without regard to the marketing materials' respective contents and (2) the C2LSR model is trained without regard to the marketing materials' respective marketing outcomes. Some examples of operations for training a C2LSR model are described in further detail below with respect to FIG. 4.

The system may train a machine learning model to generate predicted marketing outcomes based on LSRs associated with respective marketing materials (Operation 208), i.e., an LSR-to-outcome machine learning model (also referred to herein as an "LSR2O model," for ease of discussion). Specifically, LSRs associated with historical marketing materials, the system trains the LSR2O model to generate predicted marketing outcomes that match those already known for the respective marketing materials. Thus, the LSR2O model is trained to generate predicted marketing outcomes for marketing materials, given only the LSRs associated with those materials. In an embodiment, the LSR2O model is a dense neural network including one or two hidden layers. As discussed herein, the neural network may be configured to generalize from known contents (e.g., subject lines) to all potential contents (e.g., potential subject lines), by training the model on the known contents. A model trained on the LSRs for the known contents may be configured to predict marketing outcomes for any LSR, whether known or unknown.

In an embodiment, the system obtains unlabeled marketing material (Operation 210). For example, the unlabeled marketing material may be stored as a draft in a marketing platform. To predict a marketing outcome for the unlabeled marketing material, the system may apply a C2LSR model to the unlabeled marketing material, to obtain a corresponding LSR (Operation 212). The system may then apply an LSR2O model to the LSR, to obtain a predicted marketing outcome (Operation 214). In both of these operations, the system may not perform any form of semantic analysis on the content of the unlabeled marketing material; the machine learning models may produce a prediction without regard to the specific semantic structure or content of the contents.

3.2. Generating LSRS of Historical Marketing Materials

Figure 3:
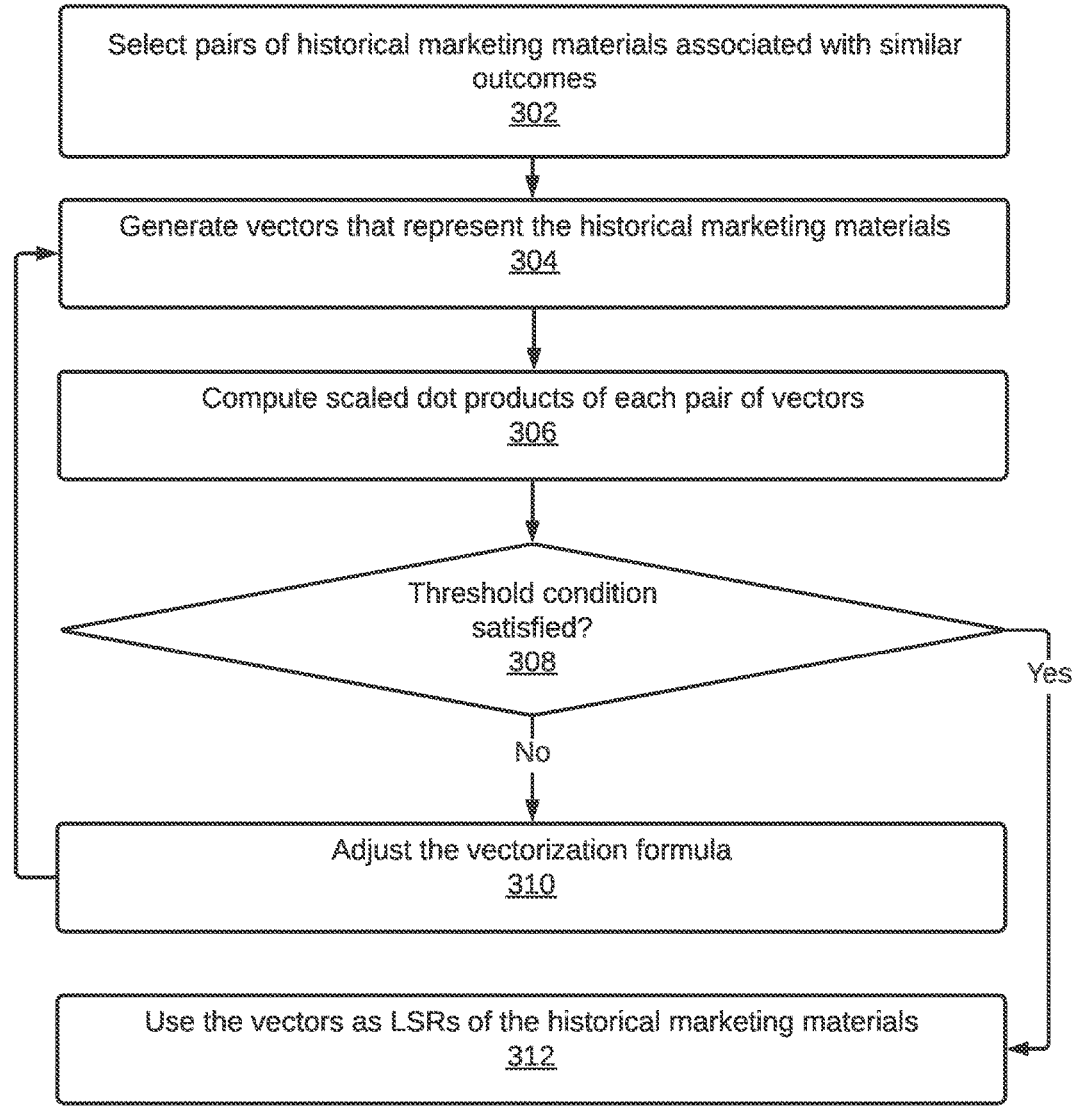
FIG. 3 illustrates an example set of operations for generating latent space representations in accordance with one or more embodiments.

FIG. 3 illustrates an example set of operations for generating LSRs of historical marketing materials in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In an embodiment, the operations illustrated in FIG. 3 correspond to Operation 204 of FIG. 2. LSRs generated according to these operations may be vectors that represent respective marketing materials. The system may generate the LSRs based on non-content properties, without regard to the marketing materials' respective contents. For example, the system may generate the LSRs so that LSRs for marketing materials having the most similar marketing outcomes are closest to each other in latent space, even if the target-facing contents (e.g., email subject lines) of those marketing materials are very different.

In an embodiment, the system selects pairs of historical marketing materials that are associated with similar marketing outcomes (Operation 302). For example, if the historical marketing materials are emails that were previously sent to prospective and/or existing customers, the system may select pairs of emails that had similar open rates. The system may pair marketing materials that have identical outcomes to a certain level of precision (e.g., emails with open rates that are identical within one decimal point, or another degree of precision). Alternatively or additionally, the system may pair marketing materials that have outcomes within a certain range of each other (e.g., emails that have open rates within five percent of each other, or another predetermined range). More than two emails may satisfy the pairing criteria, and the system may accordingly select multiple permutations of pairs of marketing materials.

As noted above, the LSRs may be vectors. The system may generate vectors that represent the marketing materials (Operation 304). For example, the system may generate vectors of numbers corresponding to the contents and/or non-content properties of the marketing materials.

Given a pair of vectors for a corresponding pair of marketing materials, the system may compute a dot product (which may be scaled, for example, as described below) of the pair of vectors (Operation 306). The system may then determine whether the dot product satisfies a threshold condition for generating LSRs (Operation 308). The objective is to obtain vectors that are very similar when the respective marketing outcomes are very similar. Accordingly, the threshold condition may be a function of the difference in outcomes for the two materials. For example, the system may use a function that scales the dot product so that the target value approaches one (or another predetermined value) when the difference in outcomes is small and approaches zero (or another predetermined value) when the difference in outcomes is large. Thus, the threshold condition may require, for example, that the scaled dot product be a specific value, or within a certain range of values on the scale of zero to one, in proportion to the difference between the two marketing outcomes.

If the threshold condition is not satisfied, then the system may adjust the vectorization formula (Operation 310). For example, in an approach using a neural network, the system may adjust the vectorization formula using back propagation, while training the neural network.

The system may then generate new vectors for the pair of marketing materials using the adjusted formula (Operation 304), compute the scaled dot product of the new vectors (Operation 306), and determine whether the new result satisfies the threshold condition (Operation 308). This process may iterate until the scaled dot product satisfies the threshold condition, at which point the system may use the vectors as LSRs of the historical marketing materials. The system may use these LSRs to train a C2OSR model as described herein. For example, in an approach using a neural network, training the neural network may continue until the constraints for all pairs of LSRs are satisfied to the extent possible.

In an embodiment, the system uses machine learning to generate the LSRs of the historical marketing materials. Machine learning may follow a similar approach to the operations described above, i.e., iterating over pairs of vectors and adjusting a vectorization formula until the vectors satisfy the threshold criterion. The system may determine that the machine learning is complete when all pairs of vectors corresponding to the historical marketing materials, or a threshold percentage of the pairs, satisfy the threshold criterion.

3.3. Training a Contents-to-LSR Model

Figure 4:
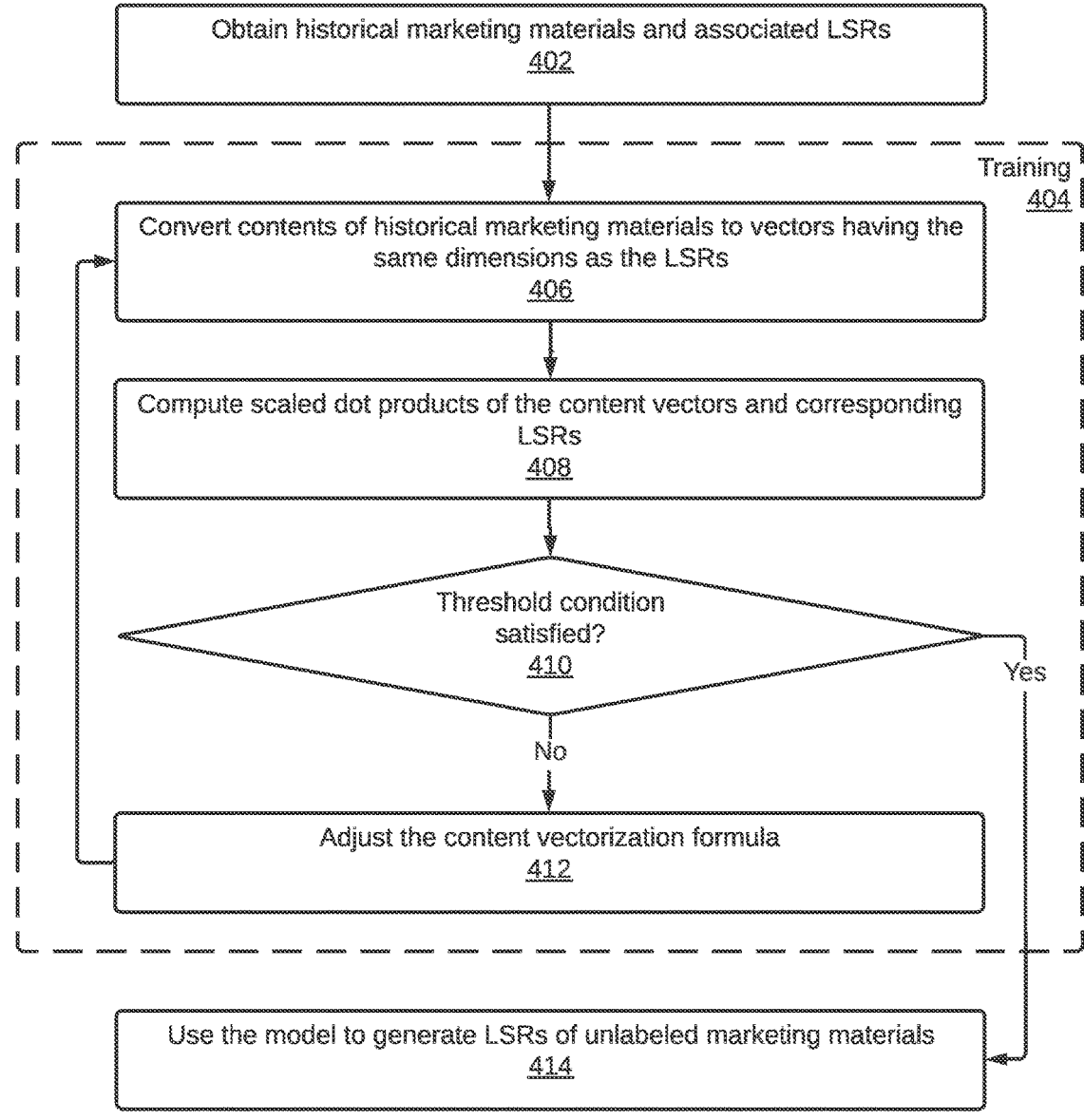
FIG. 4 illustrates an example set of operations for training a contents-to-LSR model in accordance with one or more embodiments.

FIG. 4 illustrates an example set of operations for training a C2LSR model in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

In an embodiment, a system obtains historical marketing materials and associated LSRs (Operation 402). The LSRs may be those generated by an LSR generator as described above. Based on the contents of the historical marketing materials and the associated LSRs, the system trains a machine learning model to generate LSRs based on the contents of marketing materials (Operation 404). An example of such training is described below.

As noted above, the LSRs may be vectors. In an embodiment, the system converts the contents of the historical marketing materials (e.g., email subject lines) to vectors having the same dimensions as the LSRs (Operation 406). For example, the system may generate vectors of numbers corresponding to the contents of the marketing materials. The system may compute dot products (which may be scaled as described below) of the content vectors and corresponding LSRs (Operation 408) and determine whether the scaled dot products satisfy a predetermined threshold condition (Operation 410). Specifically, given the objective of producing LSRs that match those previously generated, the target value may be the dot product of the LSR with itself, with a scaling layer to account for the diversity between the content vectors and the LSRs. Thus, the threshold condition may require that the scaled dot product be identical to, or within a threshold range of, the dot product of the LSR with itself.

If the threshold condition is not satisfied, then the system may adjust the vectorization formula (Operation 412). The system may then generate new vectors for the contents of the historical marketing materials using the adjusted formula (Operation 406), compute the scaled dot product of the new vectors with the corresponding LSRs (Operation 408), and determine whether the new result satisfies the threshold condition (Operation 410). This process may iterate until the scaled dot product satisfies the threshold condition, at which point the system may use the trained model to generate LSRs of unlabeled marketing materials (Operation 414).

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 5A:
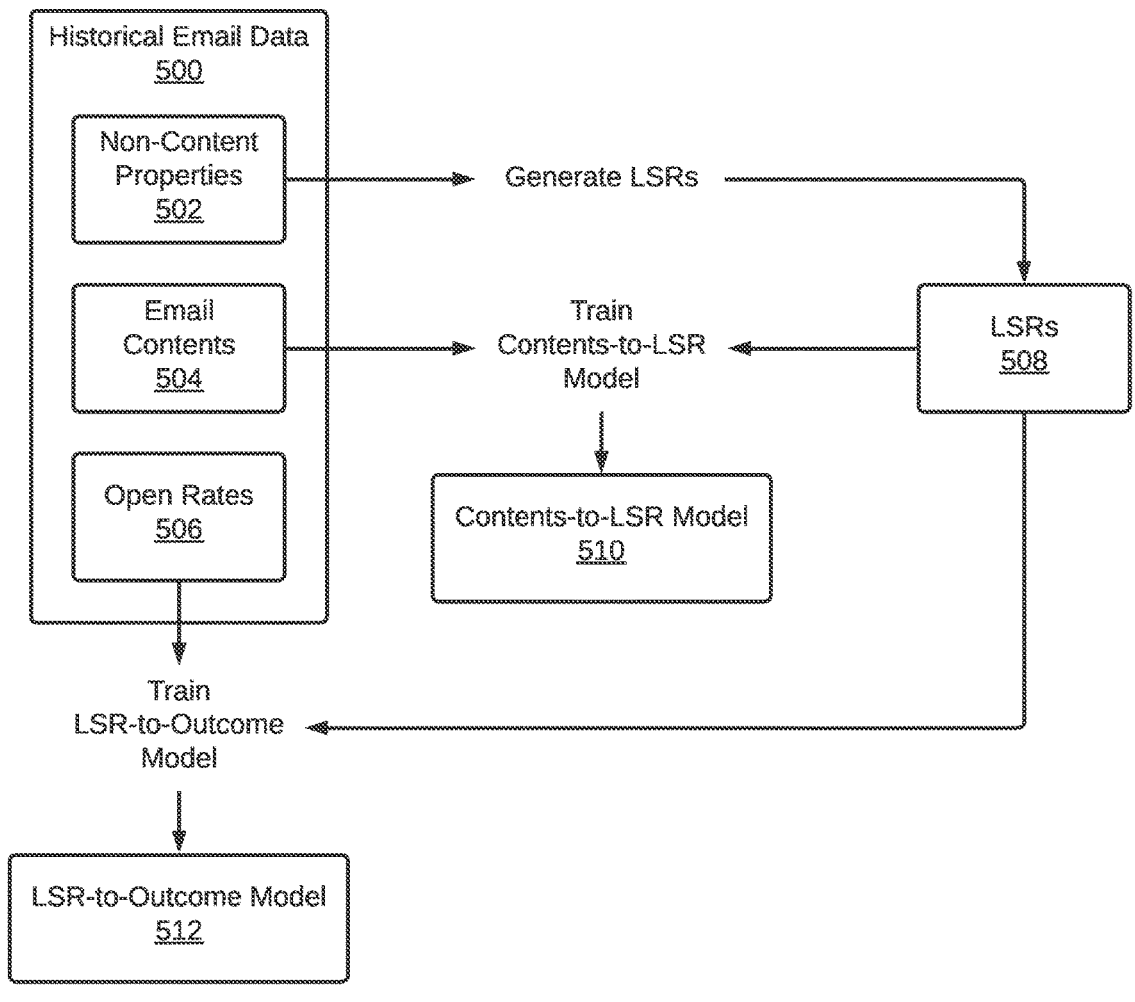
FIGS. 5A-5B illustrate an example of predicting marketing outcomes using contrastive learning in accordance with one or more embodiments.
Figure 5B:
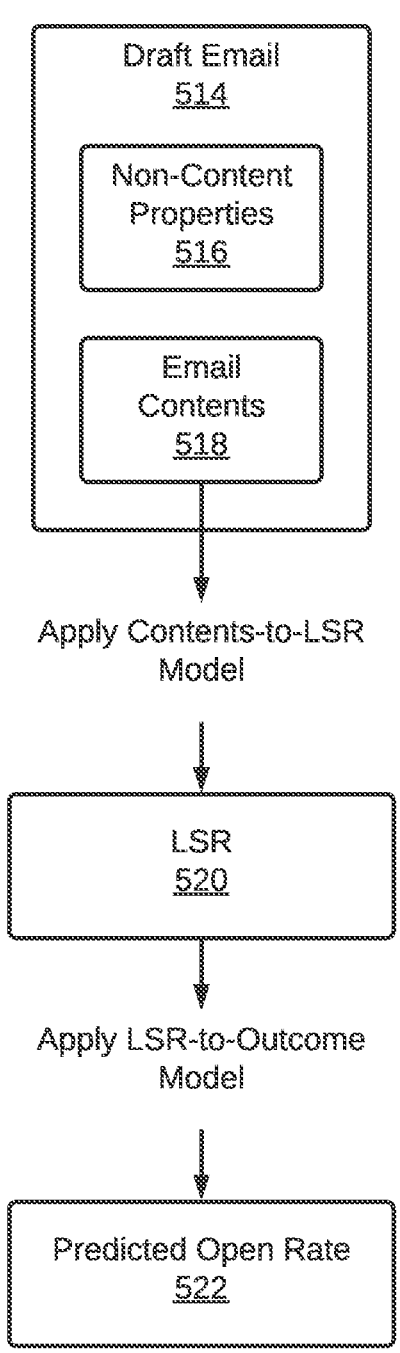

Specifically, FIGS. 5A-5B illustrate an example of predicting marketing outcomes using contrastive learning in accordance with one or more embodiments. In an embodiment, operations described with respect to FIGS. 5A-5B are performed by a marketing platform, also referred to simply as a "platform" for ease of discussion.

In the example of FIGS. 5A-5B, the platform is configured to predict open rates of marketing emails. The platform obtains historical email data 500, including the email contents 504 (specifically, in this example, the email subject lines) and non-content properties (e.g., metadata associated with the emails but not typically visible to recipients). The historical email data 500 is associated with emails that have already been sent, and for which historical open rates 506 are available. That is, for each of email represented in the historical email data 500, the open rates 506 include a corresponding open rate based on that email's actual historical performance.

Based on the non-content properties 502, the platform generates corresponding LSRs 508. Based on the LSRs 508 and the corresponding email contents 504, the platform trains a contents-to-LSR model 510. Based on the LSRs 508 and the corresponding open rates, the platform also trains an LSR-to-outcome model (Operation 512). Note that once the LSRs 508 are available, the platform may train the C2LSR model 510 and the LSR2O model 512 in parallel; neither is reliant on the other for training.

Once training is complete, the platform can use the C2LSR model 510 and the LSR2O model 512 to predict marketing outcomes for unlabeled emails, as described herein. Specifically, as shown in FIG. 5B, the platform may obtain a draft email 514 that includes email contents 518 and non-content properties 516. The platform may apply the C2LSR model 510 to the email contents 518 (e.g., the subject line), to obtain an LSR 520 corresponding to the draft email 514. The platform may subsequently apply the LSR2O model 512 to the LSR 520, to obtain a predicted open rate 522 for the draft email 514.

5. Example Subject Lines

As discussed above, a system may be configured to generate LSRs of historical marketing materials that, based on their respective historical performance, are close to each other in latent space even if their contents are very different. In an illustrative example, historical email data includes emails with the following subject lines:

1. reminder ACME manufacturing February forward looking
2. ACME trademark sign coyote the first in region
3. December anvil update and season's greetings
4. roadrunner trap weekly update October week 3
5. roadrunner bait benefit of a single active ingredient
6. plateau and tundra coyote update for region
7. test anvil drop training
8. thank you for your subscription
9. your cartoon club grant entry has been successful
10. urgent notice anvil warehouse closed for holidays
11. roadrunner trap data weekly update for 2018
12. roadrunner trap data weekly update for 2019

In this example: emails 1 through 5 may all have an open rate of 93%, even though they are semantically very different; emails 6 through 9 may all have open rates of 100%, even though they are semantically very different; emails 10 and 11 may both have open rates of 60%, even though they are semantically very different and each bear some semantic similarity to emails with much higher open rates; and email 12 may have an open rate of only 35%, even though it is semantically very similar to emails with much higher open rates.

Approaches that rely on semantic analysis would likely find high similarity between emails 4, 11, and 12 together, even though they have very different open rates. Similarly, approaches that rely on semantic analysis would likely find little similarity between emails 1 and 3, since they have no words in common and are grammatically dissimilar, even though they both have 93% open rates. One or more embodiments described herein predict open rates based on latent similarities that such approaches typically fail to consider.

6. Content Distribution

In an embodiment, predicting marketing outcomes allows for marketing strategies that are based on consistent, quantifiable metrics, rather than subjective decisions. Responsive to predicting a marketing outcome for one or more sets of marketing materials, the system may present (e.g., in a user interface) a marketing recommendation. For example, the system may recommend publishing a particular set of marketing materials over another set of marketing materials, based on their respective predicted marketing outcomes. Alternatively or additionally, responsive to comparing the predicted marketing outcomes, the system may perform one or more actions without user input, such as publishing the marketing materials with the best predicted outcomes.

One or more embodiments may identify and/or generate additional content to include in marketing materials. For example, given an email with a high predicted open rate, the system may identify and/or generate additional content (e.g., one or more images, video, audio, etc.) to include in the body of the email. The system may be configured to identify and/or generate the additional content without requiring a user to manually search and filter through available content. For example, techniques for generating images for use in content distribution are described in U.S. patent application Ser. No. 17/017,486, titled "Scalable Architecture for Automatic Generation of Content Distribution Images," filed Sep. 10, 2020, the entire contents of which are incorporated herein by reference.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service, such as execution of a particular application and/or storage of a particular amount of data). A server process responds by, for example, executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, or a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network, such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

A client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (for example, a web browser), a program interface, or an application programming interface (API).

In one or more embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In one or more embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

A computer network may implement various deployment, including but not limited to a private cloud, a public cloud, and/or a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof may be accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In one or more embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In a multi-tenant computer network, tenant isolation may be implemented to ensure that the applications and/or data of different tenants are not shared with each other. Various tenant isolation approaches may be used. Each tenant may be associated with a tenant identifier (ID). Each network resource of the multi-tenant computer network may be tagged with a tenant ID. A tenant may be permitted access to a particular network resource only if the tenant and the particular network resources are associated with the same tenant ID.

For example, each application implemented by the computer network may be tagged with a tenant ID, and tenant may be permitted access to a particular application only if the tenant and the particular application are associated with a same tenant ID. Each data structure and/or dataset stored by the computer network may be tagged with a tenant ID, and tenant may be permitted access to a particular data structure and/or dataset only if the tenant and the particular data structure and/or dataset are associated with a same tenant ID. Each database implemented by the computer network may be tagged with a tenant ID, and tenant may be permitted access to data of a particular database only if the tenant and the particular database are associated with the same tenant ID. Each entry in a database implemented by a multi-tenant computer network may be tagged with a tenant ID, and a tenant may be permitted access to a particular entry only if the tenant and the particular entry are associated with the same tenant ID. However, the database may be shared by multiple tenants.

In one or more embodiments, a subscription list indicates which tenants have authorization to access which network resources. For each network resource, a list of tenant IDs of tenants authorized to access the network resource may be stored. A tenant may be permitted access to a particular network resource only if the tenant ID of the tenant is included in the subscription list corresponding to the particular network resource.

In one or more embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted only to other devices within the same tenant overlay network. Encapsulation tunnels may be used to prohibit any transmissions from a source device on a tenant overlay network to devices in other tenant overlay networks. Specifically, packets received from the source device may be encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

In one or more embodiments, techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally include a single logical executable. With microservice applications, different microservices are independently deployable as separate executables. Microservices may communicate using Hypertext Transfer Protocol (HTTP) messages and/or according to other communication protocols via Application Programming Interface (API) endpoints. Microservices may be managed and updated separately, written in different languages, and executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

Microservices may be connected via a GUI. For example, microservices may be displayed as logical blocks within a window, frame, or other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

8.1. Triggers

The techniques described above may be encapsulated into a microservice, according to one or more embodiments. In other words, a microservice may trigger a notification (into the microservices manager for optional use by other plugged-in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects that a value has crossed a triggering threshold.

A trigger, when satisfied, may output data for consumption by the target microservice. Alternatively or additionally, when satisfied, a trigger may output a binary value indicating that the trigger has been satisfied, and/or may output the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

8.2. Actions

A plugged-in microservice application may expose actions to the microservices manager. The exposed actions may receive, as input, data or an identification of a data object or location of data that causes data to be moved into a data cloud.

The exposed actions may receive, as input, a request to increase or decrease existing alert thresholds. The input may identify existing in-application alert thresholds and whether to increase, decrease, or delete the threshold. The input may request the microservice application to create new in-application alert thresholds. The in-application alerts may trigger alerts to the user while logged into the application or may trigger alerts to the user, using default or user-selected alert mechanisms available within the microservice application itself, rather than through other applications plugged into the microservices manager.

The microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

9. Hardware Overview

In one or more embodiments, techniques described herein are implemented by one or more special-purpose computing devices. The special-purpose computing device(s) may be hard-wired to perform the techniques, and/or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, FPGAs, or NPUs with custom programming to accomplish the techniques. A special-purpose computing device may be desktop computer systems, portable computer systems, handheld devices, networking devices, or any other device that incorporates hard-wired and/or program logic to implement the techniques.

Figure 6:
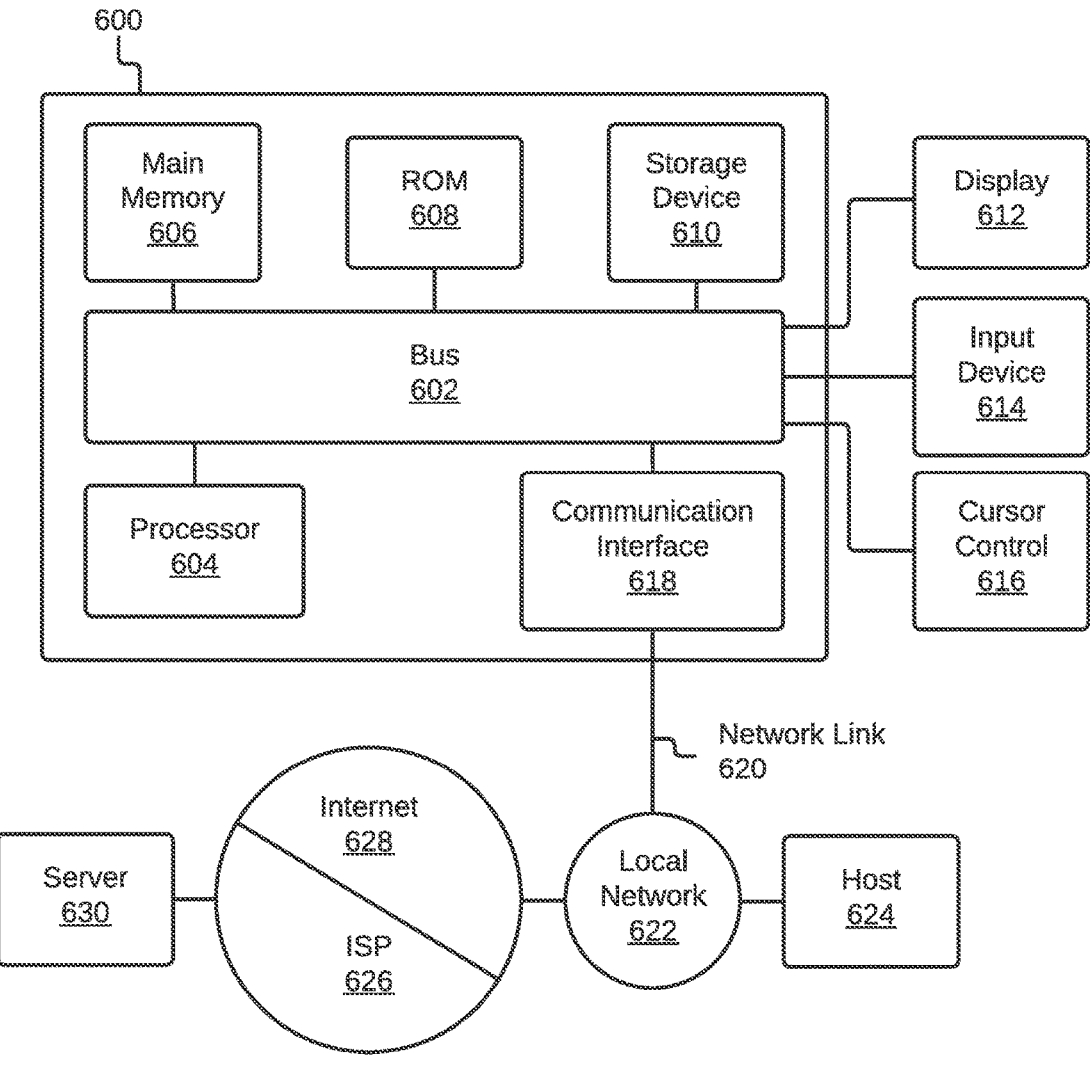
FIG. 6 shows a block diagram that illustrates a computer system in accordance with one or more embodiments.

For example, FIG. 6 is a block diagram that illustrates a computer system 600 upon which one or more embodiments of the invention may be implemented. The computer system 600 includes a bus 602 or other communication mechanism for communicating information, and a hardware processor 604 coupled with bus 602 for processing information. The hardware processor 604 may be, for example, a general-purpose microprocessor.

The computer system 600 also includes a main memory 606, such as a random access memory (RAM) or other dynamic storage device, coupled to bus 602 for storing information and instructions to be executed by processor 604. The main memory 606 also may be used for storing temporary variables or other intermediate information during execution of instructions to be executed by processor 604. Such instructions, when stored in non-transitory storage media accessible to the processor 604, render the computer system 600 into a special-purpose machine that is customized to perform the operations specified in the instructions.

The computer system 600 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions.

The computer system 600 may be coupled via the bus 602 to a display 612, such as a cathode ray tube (CRT), for displaying information to a computer user. An input device 614, including alphanumeric and other keys, is coupled to the bus 602 for communicating information and command selections to the processor 604. Another type of user input device is cursor control 616, such as a mouse, a trackball, or cursor direction keys for communicating direction information and command selections to the processor 604 and for controlling cursor movement on the display 612. This input device typically has two degrees of freedom in two axes, a first axis (e.g., x) and a second axis (e.g., y), that allows the device to specify positions in a plane.

The computer system 600 may implement techniques described herein using customized hard-wired logic, one or more ASICs or FPGAs, firmware, and/or program logic which in combination with the computer system 600 causes or programs the computer system 600 to be a special-purpose machine. In one or more embodiments, the techniques herein are performed by the computer system 600 in response to the processor 604 executing one or more sequences of one or more instructions contained in the main memory 606. Such instructions may be read into the main memory 606 from another storage medium, such as the storage device 610. Execution of the sequences of instructions contained in the main memory 606 causes the processor 604 to perform the process steps described herein. Alternatively, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as storage device 610. Volatile media includes dynamic memory, such as the main memory 606. Common forms of storage media include, for example, a floppy disk, a flexible disk, hard disk, solid state drive, magnetic tape, or any other magnetic data storage medium, a read-only compact disc (CD-ROM), any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires of the bus 602. Transmission media can also take the form of acoustic or light waves, such as those generated during radio frequency (RF) and infrared data communications.

Various forms of media may be involved in carrying one or more sequences of one or more instructions to the processor 604 for execution. For example, the instructions may initially be carried on a magnetic disk or solid-state drive of a remote computer. The remote computer can load the instructions into its dynamic memory and send the instructions over a telephone line or other communications medium, using a modem. A modem local to the computer system 600 can receive the data on the telephone line or other communications medium and use an infrared transmitter to convert the data to an infrared signal. An infrared detector can receive the data carried in the infrared signal and appropriate circuitry can place the data on the bus 602. The bus 602 carries the data to the main memory 606, from which the processor 604 retrieves and executes the instructions. The instructions received by the main memory 606 may optionally be stored on the storage device 610, either before or after execution by processor 604.

The computer system 600 also includes a communication interface 618 coupled to the bus 602. The communication interface 618 provides a two-way data communication coupling to a network link 620 that is connected to a local network 622. For example, the communication interface 618 may be an integrated services digital network (ISDN) card, cable modem, satellite modem, or a modem to provide a data communication connection to a corresponding type of telephone line. As another example, the communication interface 618 may be a local area network (LAN) card configured to provide a data communication connection to a compatible LAN. Wireless links may also be implemented. In any such implementation, the communication interface 618 sends and receives electrical, electromagnetic, or optical signals that carry digital data streams representing various types of information.

The network link 620 typically provides data communication through one or more networks to other data devices. For example, the network link 620 may provide a connection through a local network 622 to a host computer 624 or to data equipment operated by an Internet Service Provider (ISP) 626. The ISP 626 in turn provides data communication services through the world wide packet data communication network now commonly referred to as the "Internet" 628. The local network 622 and Internet 628 both use electrical, electromagnetic, or optical signals that carry digital data streams. The signals through the various networks and the signals on the network link 620 and through the communication interface 618, which carry the digital data to and from the computer system 600, are example forms of transmission media.

The computer system 600 can send messages and receive data, including program code, through the network(s), network link 620, and communication interface 618. In the Internet example, a server 630 might transmit a requested code for an application program through the Internet 628, ISP 626, local network 622, and communication interface 618.

The received code may be executed by processor 604 as it is received, and/or may be stored in the storage device 610 or other non-volatile storage for later execution.

10. Miscellaneous; Extensions

Embodiments are directed to a system with one or more devices that include a hardware processor and that are configured to perform any of the operations described herein and/or recited in any of the claims below.

In one or more embodiments, a non-transitory computer-readable storage medium stores instructions which, when executed by one or more hardware processors, cause performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions that, when executed by one or more processors, cause performance of operations comprising:

obtaining a plurality of historical marketing messages;

obtaining a plurality of historical open rates associated respectively with the plurality of historical marketing messages;

based on non-content properties of the plurality of historical marketing messages and not based on respective contents of the plurality of marketing messages, generating a plurality of latent space representations associated respectively with the plurality of historical marketing messages;

wherein first message content of a first historical marketing message in the plurality of historical marketing messages is more semantically similar to second message content of a second historical marketing message in the plurality of historical marketing messages than to third message content of a third historical marketing message in the plurality of historical marketing messages; and wherein despite the first message content being more semantically similar to the second message content than to the third message content, a first latent space representation associated with the first historical marketing message is farther, in latent space, from a second latent space representation associated with the second historical marketing message than from a third latent space representation associated with the third historical marketing message;

based on the plurality of latent space representations and respective contents of the plurality of historical marketing messages, training a first machine learning model to map contents of marketing messages to corresponding latent space representations of the marketing messages;

based at least on the plurality of latent space representations and the plurality of historical open rates, training a second machine learning model to map latent space representations of marketing messages to predicted open rates of the marketing messages;

applying the first machine learning model to a particular marketing message, to obtain a latent space representation of the particular marketing message;

applying the second machine learning model to the latent space representation of the particular marketing message, to obtain a predicted open rate of the particular marketing message;

based at least in part on the predicted open rate of the particular marketing message:

generating, without user input, additional digital content comprising one or more of an image, a video, or audio content to include in the particular marketing message; and publishing, without user input, the particular marketing message along with the additional digital content over a network to one or more digital distribution targets.

2. The one or more non-transitory machine-readable media of claim 1, wherein training the first machine learning model to map contents of marketing messages to corresponding latent space representations of the marketing messages comprises:

computing a square of a magnitude of a particular latent space representation in the plurality of latent space representations;

over a plurality of epochs of machine learning:

converting corresponding contents in the plurality of historical marketing messages to a vector having same dimensions as the particular latent space representation;

computing a dot product of the vector with the particular latent space representation;

wherein over the plurality of epochs, the machine learning targets convergence of the dot product with the square of the magnitude of the particular latent space representation.

3. The one or more non-transitory machine-readable media of claim 1, wherein training the first machine learning model and training the second machine learning model are performed at least partly in parallel.

4. The one or more non-transitory machine-readable media of claim 1, wherein generating the plurality of latent space representations comprises vectorizing the plurality of historical marketing messages.

5. The one or more non-transitory machine-readable media of claim 1, wherein the first machine learning model and the second machine learning model comprise respective layers in a single neural network.

6. The one or more non-transitory machine-readable media of claim 1, wherein the plurality of historical marketing messages comprises a plurality of historical marketing emails.

7. One or more non-transitory machine-readable media storing instructions that, when executed by one or more processors, cause performance of operations comprising:

obtaining a plurality of historical marketing messages;

obtaining a plurality of historical open rates associated respectively with the plurality of historical marketing messages;

based on non-content properties of the plurality of historical marketing messages and not based on respective contents of the plurality of marketing messages, generating a plurality of latent space representations associated respectively with the plurality of historical marketing messages;

wherein first message content of a first historical marketing message in the plurality of historical marketing messages is more semantically similar to second message content of a second historical marketing message in the plurality of historical marketing messages than to third message content of a third historical marketing message in the plurality of historical marketing messages; and wherein despite the first message content being more semantically similar to the second message content than to the third message content, a first latent space representation associated with the first historical marketing message is farther, in latent space, from a second latent space representation associated with the second historical marketing message than from a third latent space representation associated with the third historical marketing message;

based on the plurality of latent space representations and respective contents of the plurality of historical marketing messages, training a first machine learning model to map contents of marketing messages to corresponding latent space representations of the marketing messages;

based at least on the plurality of latent space representations and the plurality of historical open rates, training a second machine learning model to map latent space representations of marketing messages to predicted open rates of the marketing messages;

applying the first machine learning model to a particular marketing message, to obtain a latent space representation of the particular marketing message;

applying the second machine learning model to the latent space representation of the particular marketing message, to obtain a predicted open rate of the particular marketing message;

based at least in part on the predicted open rate of the particular marketing message:

generating, without user input, additional digital content comprising one or more of an image, a video, or audio content to include in the particular marketing message; and publishing, without user input, the particular marketing message along with the additional digital content over a network to one or more digital distribution targets.

8. The one or more non-transitory machine-readable media of claim 7, wherein training the first machine learning model to map contents of marketing materials to corresponding latent space representations of the marketing materials comprises:

computing a square of a magnitude of a particular latent space representation in the plurality of latent space representations;

over a plurality of epochs of machine learning:

converting corresponding contents in the plurality of historical marketing materials to a vector having same dimensions as the particular latent space representation;

computing a dot product of the vector with the particular latent space representation;

wherein over the plurality of epochs, the machine learning targets convergence of the dot product with the square of the magnitude of the particular latent space representation.

9. The one or more non-transitory machine-readable media of claim 7, wherein training the first machine learning model and training the second machine learning model are performed at least partly in parallel.

10. The one or more non-transitory machine-readable media of claim 7, wherein generating the plurality of latent space representations comprises vectorizing the plurality of historical marketing materials.

11. The one or more non-transitory machine-readable media of claim 7, wherein the first machine learning model and the second machine learning model comprise respective layers in a single neural network.

12. The one or more non-transitory machine-readable media of claim 7, wherein the predicted marketing outcomes of the marketing materials comprise predicted open rates of emails.

13. The one or more non-transitory machine-readable media of claim 1, wherein the plurality of latent space representations comprises a plurality of vectors of numbers corresponding to respective non-content properties of the plurality of historical marketing messages.

* * * * *